United States Patent
Angst

(10) Patent No.: US 8,479,486 B2
(45) Date of Patent: Jul. 9, 2013

(54) OIL SYSTEM HEATING FOR AIRCRAFT GAS TURBINES

(75) Inventor: Robert Angst, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 368 days.

(21) Appl. No.: 12/619,780

(22) Filed: Nov. 17, 2009

(65) Prior Publication Data

US 2010/0122518 A1    May 20, 2010

(30) Foreign Application Priority Data

Nov. 18, 2008    (DE) .................... 10 2008 057 828

(51) Int. Cl.
   *F02C 7/06* (2006.01)
   *F02C 7/00* (2006.01)
   *F01D 25/18* (2006.01)

(52) U.S. Cl.
   USPC ................ 60/39.08; 60/779; 184/6.11

(58) Field of Classification Search
   USPC ............... 184/6.11; 60/39.83, 39.091, 779, 60/782, 39.08
   See application file for complete search history.

(56) References Cited

U.S. PATENT DOCUMENTS

| | | | | |
|---|---|---|---|---|
| 2,571,166 A | * | 10/1951 | Rossetto | 184/6.11 |
| 2,827,342 A | * | 3/1958 | Roach | 384/288 |
| 3,066,664 A | * | 12/1962 | McNew et al. | 123/196 S |
| 3,722,634 A | * | 3/1973 | Ogasawara et al. | 188/73.37 |
| 4,020,632 A | * | 5/1977 | Coffinberry et al. | 60/773 |
| 4,170,873 A | * | 10/1979 | Milo | 60/39.08 |
| 4,511,016 A | * | 4/1985 | Doell | 184/6.11 |
| 5,046,306 A | * | 9/1991 | Borre, Jr. | 60/39.08 |
| 5,253,470 A | * | 10/1993 | Newton | 60/39.08 |
| 5,320,196 A | * | 6/1994 | Mouton | 184/6.4 |
| 5,429,208 A | * | 7/1995 | Largillier et al. | 184/6.11 |
| 5,558,303 A | | 9/1996 | Koethe et al. | |
| 5,615,547 A | * | 4/1997 | Beutin et al. | 60/39.08 |
| 6,487,862 B1 | * | 12/2002 | Doorley | 60/778 |
| 2007/0234739 A1 | * | 10/2007 | Delaloye et al. | 60/786 |
| 2007/0245706 A1 | * | 10/2007 | Bell et al. | 60/39.08 |
| 2007/0246302 A1 | * | 10/2007 | Bell et al. | 184/6.11 |
| 2009/0078508 A1 | * | 3/2009 | DeLaloye | 184/6.11 |
| 2010/0012434 A1 | * | 1/2010 | Pisseloup | 184/6.11 |

FOREIGN PATENT DOCUMENTS

| | | |
|---|---|---|
| CH | 207906 | 12/1939 |
| DE | 670801 | 1/1939 |
| DE | 674780 | 4/1939 |
| DE | 709158 | 8/1941 |
| DE | 728142 | 11/1942 |

(Continued)

OTHER PUBLICATIONS

German Search Report dated Oct. 22, 2009 from counterpart German patent application.
European Search Report dated Apr. 2, 2013 from counterpart application.

*Primary Examiner* — Gerald L Sung
(74) *Attorney, Agent, or Firm* — Timothy J. Klima; Shuttleworth & Ingersoll, PLC

(57) ABSTRACT

An oil pre-heating apparatus for an aircraft gas turbine has a suction line 2 connectable to an oil tank 1 of an aircraft gas turbine, with a heat source 3 connected to the suction line 2 and operated independently of the aircraft and with a return line 4 connected to the heat source 3 and connectable to the oil tank 1.

16 Claims, 1 Drawing Sheet

| | FOREIGN PATENT DOCUMENTS | | WO | 07121551 | 11/2007 |
|----|----|----|----|----|----|
| DE | 3316229 | 11/1984 | | | |
| DE | 102005048019 | 4/2007 | * cited by examiner | | |

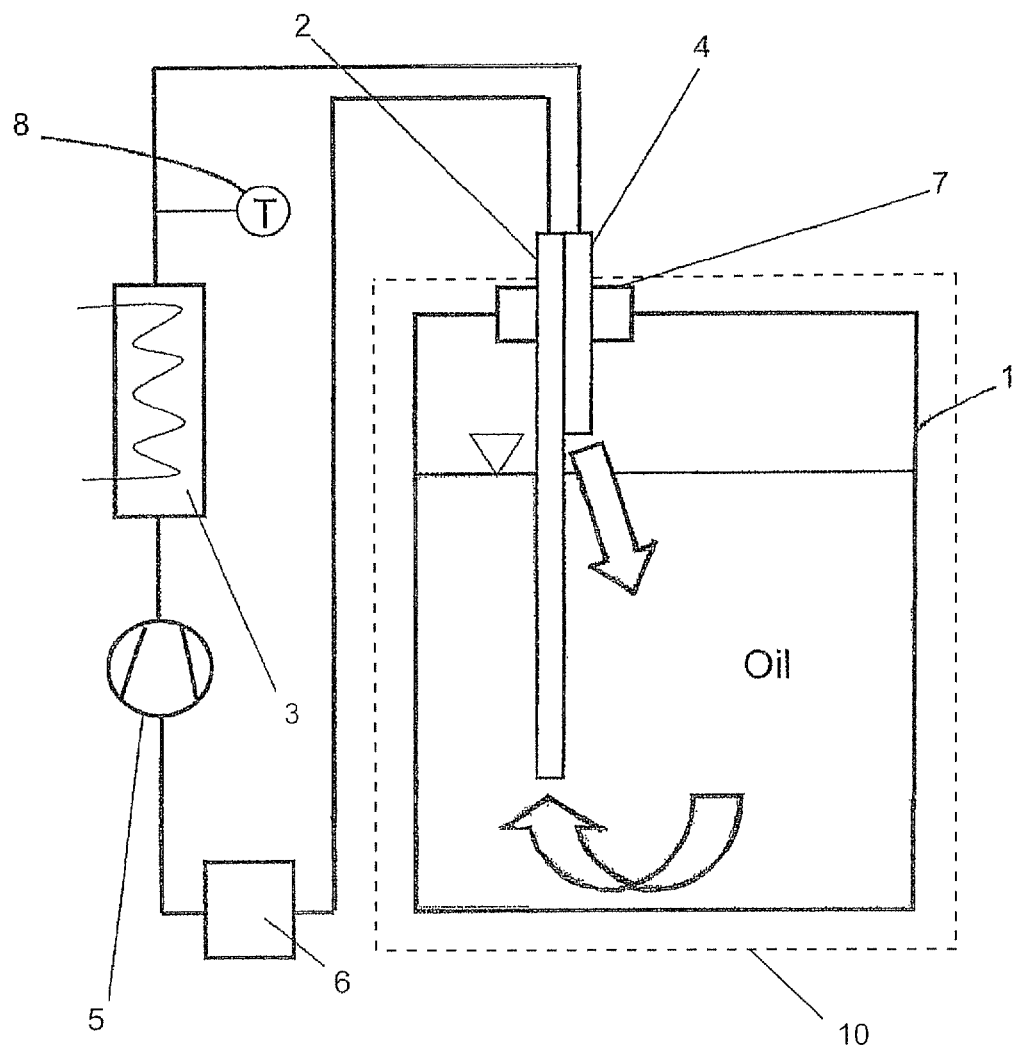

OIL SYSTEM HEATING FOR AIRCRAFT GAS TURBINES

This application claims priority to German Patent Application DE 10 2008 057 828.2-13 filed Nov. 18, 2008, the entirety of which is incorporated by reference herein.

This invention relates to an oil pre-heating apparatus and to an oil pre-heating method for aircraft gas turbines.

It is generally known that aircraft gas turbines (aircraft engines) must be startable under very unfavorable environmental conditions. These include, in particular, very low ambient temperatures. Such ambient temperatures will cool the oil in the oil system of the gas turbine to a level at which its viscosity is extremely high. In order to avoid damage to bearings and other components of the aircraft and/or the aircraft gas turbine, a minimum permissible starting temperature is specified for the oil system in relation to the oil type.

This minimum permissible starting temperature for the oil system is in some cases higher than the expected lowest ambient temperature or the actual ambient temperature. Consequently, the aircraft gas turbine cannot be started without additional measures.

The state of the art shows various methods for heating the oil of the oil system and/or the entire aircraft gas turbine prior to start. For example, it is known to heat the engine with external hot-air blowers or to use hot air from an auxiliary power unit (APU). In addition, the state of the art also shows electrical oil tank heaters installed in the aircraft or the aircraft gas turbine.

From Specification U.S. Pat. No. 5,558,303 it is known to heat the fuel in the wings with an external apparatus, thereby de-icing the wings.

Without such additional apparatuses for heating the oil system, the aircraft gas turbine cannot be started and possibly not be rotated, even in idle (cranking).

The apparatuses known from the state of the art either increase the weight of the aircraft gas turbine (engine), as for example installed heaters, or do not immediately reach the oil, as for example hot air blown into the fan. Furthermore, high material investment is required with, for example, smaller auxiliary power units being used as hot air blowers. As a further disadvantage, additional installations or modifications to the aircraft gas turbine or the aircraft are required entailing an increase in cost and weight.

In a broad aspect, the present invention provides an apparatus and a method for reliably pre-heating the oil system, while being easily and cost-effectively applicable and featuring low weight, simplicity of design and ease of operation.

According to the present invention, it is therefore provided that cold oil is removed from an oil tank of an aircraft gas turbine or an aircraft by a suction line. This cold oil is heated by a heat source connected to the suction line and returned to the oil tank via a return line. The present invention therefore provides a very simple system enabling the oil to be removed and returned preferably via, for example, an oil filler port or an oil drain port, thereby dispensing with additional installation measures on an aircraft or an aircraft gas turbine.

The system according to the present invention is also characterized by high operational reliability, dispensing with the need to install heat sources or heaters directly in the aircraft engine, the aircraft gas turbine or the aircraft. Rather, the heat source according to the present invention can be set up externally. Being easily connectable to the oil tank, the entire apparatus can either be stationed externally or carried in the cargo hold of the aircraft.

According to the present invention, the oil can be heated to either the minimum permissible starting temperature or an even higher temperature.

In a particularly favorable development of the present invention, it is provided that the apparatus has an additional pump arranged, for example, in the suction line and adding to the recirculation of the oil. Furthermore, an extra storage tank can be provided in the suction line or the return line, for example.

Temperature is monitored by a temperature control/regulating unit, enabling the heat output of the heat source and the heat-up time of the oil to be appropriately controlled or regulated.

The external heat source can use different energies, for example gas, kerosene, electricity or hot air. Therefore, according to the present invention, the heat source can either be operated fully independently or coupled to an auxiliary power unit (APU) or an already running engine.

In a preferred embodiment of the present invention, the inventive system can be small-size and mobile. It can be used for shorter periods or operated for longer periods, for example overnight, to preventively avoid excessive cooling of the oil system.

The possibility to provide a storage tank enables a volume of hot oil to be fed through the line system of the aircraft gas turbine or the engine, thereby heating also other components, for example pumps or oil filters.

Owing to the external arrangement of the apparatus according to the present invention, it can be confined to those applications in which it is really useful. Accordingly, installation is dispensable on aircraft usually not operated in low-temperature regimes. This also lowers overall costs and aircraft weight.

In a particularly favorable embodiment, the present invention enables an oil filler port of the oil tank to be used for oil removal or return, respectively. Accordingly, conversion or modification of the aircraft or the engine itself is not required.

Gently rotating the engine (cranking) upon heating the oil in an oil tank enables also the other lines to be flushed with heated oil, thereby warming up other accessories (for example pumps).

The present invention is more fully described in light of the accompanying drawing showing a preferred embodiment. In the drawing, FIG. 1 is a schematic representation of the system in accordance with the present invention.

FIG. 1 very schematically shows an oil tank 1 arranged, for example, in an aircraft 10 or an aircraft gas turbine. Oil is removed via a suction line 2 which is tubular and fitted into the oil tank 1, for example through an oil filler port 7. Oil removal takes place, for example, from the bottom area of the oil tank 1.

In the example, oil is fed through the suction line 2 via a storage tank 6 and a pump 5 to a heat source 3.

Via the heat source 3, which, for example, can be a heat exchanger, a heating device or similar, the oil is heated and returned to the oil tank 1 via a return line 4. The return line 4 can in its end area be parallel or one-piece with the suction line 2. It can have different length, so that the hot, returned oil is fed into the upper area of the oil tank 1.

In the example shown, a temperature control/regulating device 8 is provided to control or regulate the heating of the oil.

LIST OF REFERENCE NUMERALS

1 Oil tank
2 Suction line

3 Heat source
4 Return line
5 Pump
6 Storage tank
7 Oil filler port
8 Temperature control/regulating device

What is claimed is:

1. An oil pre-heating apparatus for an aircraft gas turbine, comprising:
   a suction line connectable to an oil tank of an aircraft gas turbine;
   a heat source connected to the suction line, positioned externally of the aircraft and operated independently of the aircraft; and
   a return line connected to the heat source and connectable to the oil tank;
   wherein the heat source is selectively connectable to the oil tank for pre-heating oil in the oil tank and selectively disconnectable from the oil tank to be separated from the aircraft when the oil in the oil tank has been pre-heated;
   wherein the suction line has an end portion for connection to the oil tank and the return line has an end portion for connection to the oil tank, and the end portions of the suction line and return line are positioned adjacent each other and connected together for simultaneous insertion into and removal from the oil tank through a single oil port of the oil tank.

2. The apparatus of claim 1, and further comprising a pump arranged in at least one of the suction line and the return line.

3. The apparatus of claim 2, and further comprising a storage tank arranged in at least one of the suction line and the return line.

4. The apparatus of claim 3, and further comprising a temperature regulating device.

5. The apparatus of claim 1, and further comprising a storage tank arranged in at least one of the suction line and the return line.

6. The apparatus of claim 1, and further comprising a temperature regulating device.

7. An oil pre-heating method for aircraft gas turbines, comprising:
   removing oil from an oil tank associated with an aircraft gas turbine;
   heating the oil with a heat source external to the aircraft; and
   returning the oil to the oil tank;
   selectively connecting the heat source to the oil tank for heating the oil and selectively disconnecting the heat source from the oil tank to separate the heat source from the aircraft when the oil has been heated;
   providing a suction line with an end portion for connection to the oil tank and a return line with an end portion for connection to the oil tank, and connecting the end portions of the suction line and return line in a position adjacent each other and connected together for simultaneous insertion into and removal from the oil tank through a common oil port of the oil tank.

8. The method of claim 7, and further comprising returning the oil to the oil tank at a position separated from the removal point.

9. The method of claim 8, and further comprising removing the oil via an oil filler port and returning the oil via the oil filler port.

10. The method of claim 8, and further comprising removing the oil via an oil drain port and returning the oil via the oil drain port.

11. The method of claim 9, and further comprising regulating a temperature of the oil.

12. The method of claim 7, and further comprising removing the oil via an oil filler port and returning the oil via the oil filler port.

13. The method of claim 7, and further comprising removing the oil via an oil drain port and returning the oil via the oil drain port.

14. The method of claim 7, and further comprising regulating a temperature of the oil.

15. The method of claim 7, and further comprising rotating the aircraft gas turbine to flush lines of an oil supply system with heated oil to warm at least one of the oil supply system and an accessory.

16. The method of claim 9, and further comprising rotating the aircraft gas turbine to flush lines of an oil supply system with heated oil to warm at least one of the oil supply system and an accessory.

* * * * *